(12) United States Patent
Goldick (10) Patent No.: US 7,058,667 B2
(45) Date of Patent: Jun. 6, 2006

(54) METHOD AND SYSTEM FOR CREATING AND MAINTAINING VERSION-SPECIFIC PROPERTIES IN A FILE

(75) Inventor: Jonathan S Goldick, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 163 days.

(21) Appl. No.: 09/750,366

(22) Filed: Dec. 27, 2000

(65) Prior Publication Data

US 2002/0116406 A1     Aug. 22, 2002

(51) Int. Cl.
*G06F 17/30* (2006.01)
*G06F 12/00* (2006.01)

(52) U.S. Cl. .................. 707/203; 707/200; 707/201

(58) Field of Classification Search ............... 707/203, 707/200, 201; 714/38
See application file for complete search history.

(56) References Cited

U.S. PATENT DOCUMENTS

| | | | |
|---|---|---|---|
| 5,117,352 A | 5/1992 | Falek ........................... 714/4 |
| 5,161,227 A | 11/1992 | Dias et al. .................. 718/104 |
| 5,303,368 A | 4/1994 | Kotaki ......................... 707/8 |
| 5,367,671 A | 11/1994 | Feigenbaum et al. ....... 395/600 |
| 5,459,862 A | 10/1995 | Garliepp et al. |
| 5,485,607 A | 1/1996 | Lomet et al. ................. 707/8 |
| 5,502,840 A | 3/1996 | Barton ...................... 710/200 |
| 5,729,743 A * | 3/1998 | Squibb ....................... 707/203 |
| 5,745,747 A | 4/1998 | Chang et al. ................. 707/8 |
| 5,806,078 A * | 9/1998 | Hug et al. .................. 715/511 |
| 5,832,484 A | 11/1998 | Sankaran et al. ............. 707/8 |
| 5,892,904 A * | 4/1999 | Atkinson et al. ........... 713/201 |
| 5,983,241 A * | 11/1999 | Hoshino .................... 707/203 |
| 5,991,774 A * | 11/1999 | Tate et al. ................. 707/203 |
| 6,026,401 A | 2/2000 | Brealy et al. ................. 707/8 |
| 6,035,423 A * | 3/2000 | Hodges et al. ............... 714/38 |
| 6,052,531 A * | 4/2000 | Waldin et al. .............. 717/170 |
| 6,067,410 A * | 5/2000 | Nachenberg ................. 703/28 |
| 6,366,930 B1 * | 4/2002 | Parker et al. ............... 707/203 |
| 6,412,034 B1 | 6/2002 | Chan ......................... 710/200 |
| 6,510,478 B1 | 1/2003 | Jeffords et al. ............. 710/200 |
| 6,529,905 B1 | 3/2003 | Bray et al. ..................... 707/8 |

(Continued)

FOREIGN PATENT DOCUMENTS

EP         0 986 009 A3      8/1996

(Continued)

OTHER PUBLICATIONS

"HTTP Extensions for Distributed Authority—WEBDAV" by Y. Goland, Microsoft; E. Whitehead, UC Irvine; A. Faizi, Netscape; S. Carter, Novell; and D. Jensen, Novell, Feb. 1999, Network Working Group, Request for Comments: 2518, Standards Track.

(Continued)

*Primary Examiner*—Frantz Coby
*Assistant Examiner*—Cindy Nguyen
(74) *Attorney, Agent, or Firm*—Merchant & Gould P.C.

(57) ABSTRACT

A method and system creates and maintains a version-specific attribute or property that is stored as part of a file in a file system, contains specific version information relating to how or when the attribute was created and is automatically invalidated when a predetermined "update" event occurs. Third party applications generally create and access these versions-specific attributes to thereby eliminate the need for external logs or databases to store persistent state information.

17 Claims, 4 Drawing Sheets

U.S. PATENT DOCUMENTS

| | | | |
|---|---|---|---|
| 6,577,920 B1 * | 6/2003 | Hypponen et al. | 700/200 |
| 6,625,698 B1 | 9/2003 | Vartti | 711/141 |
| 6,629,127 B1 | 9/2003 | Deen et al. | 709/203 |
| 6,748,470 B1 | 6/2004 | Goldick | 710/200 |
| 6,763,466 B1 * | 7/2004 | Glover | 713/200 |

FOREIGN PATENT DOCUMENTS

| | | |
|---|---|---|
| EP | 0 738 982 A2 | 10/1996 |
| EP | 0 738 982 A3 | 10/1996 |
| EP | 0 986 009 A2 | 8/1999 |
| WO | WO 01/37081 | 5/2001 |

OTHER PUBLICATIONS

PCT Search Report in PCT Application Serial No. 01130444.1-1243.

M. Norton, "OS/2s Extended Attributes". Technical Support, 'Online!, Jul. 1996; http://www.naspa.com/PDF/96/T9607014, pdf; 2 pages.

Russinovich, M., "Inside On-Access Virus Scanners", Windows & .Net Magazine Network, Sep. 1996, 3 pages.

Patent Abstracts of Japan, vol. 007, No. 138. Jun. 16, 1983 & JP 58 052740 A: Fujitsu Ltd; Mar. 29, 1983.

EP Search Report for EP 01 13 0444.

M. Norton, "OS/2s Extended Attributes", Technical Support, 'Online!, Jul. 1996; http://www.naspa.com/PDF/96/T9607014, pdf; 2 pages.

Russinovich, M., "Inside On-Access Virus Scanners", Windows & .Net Magazine Network, Sep. 1997, 3 pages.

Patent Abstracts of Japan, vol. 007, No. 138. Jun. 16, 1983 & JP 58 052740 A; Fujitsu Ltd; Mar. 29, 1983.

* cited by examiner

METHOD AND SYSTEM FOR CREATING AND MAINTAINING VERSION-SPECIFIC PROPERTIES IN A FILE

TECHNICAL FIELD

This invention relates generally to file systems and more particularly to the format and management of file attributes stored as part of each file in a particular file system. More particularly still, the present invention relates to the use of file attributes to provide status information to third party applications.

BACKGROUND OF THE INVENTION

Computer information is typically stored in components known as files. A "file," as used herein, is a complete named collection of information such as a program, a set of data used by a program, or a user created document. Hereinafter, the different types of information that may be within a file are collectively referred to as "file data." A file may also be thought of as the basic unit of storage that enables a computer to distinguish one set of information from another. Consequently, a file is the "glue" that binds a conglomeration of instructions, numbers, words or images into a coherent unit that a user can retrieve, change, delete, save or send to an output device.

Typically within a particular computer system, all files in that system adhere to a particular format. This format is predefined according to protocols of the file system. A file system is the overall structure in which files are named, stored and organized. A file system consists of files, directories or folders and the information needed to locate and access these items.

In addition to defining the file format, most file systems also provide the framework to allow the creation of file attributes. File attributes are units of information stored in combination with file data to provide information about a file, wherein the attribute information is separate from the actual file data. Generally, most file attributes are standard in nature, including such information as a file name, a file size, a time value, etc. These items may typically be found as part of a header, i.e., a portion of each file that provides information about that file. For example, the file attributes may be automatically updated as the value changes, e.g., the file size or time value may be updated by the system when the file is modified and thereafter saved. Other file attributes, such as the file name may be changed without modifying the contents of the file.

Often, third party applications work in combination with a file system to provide additional system features or functions, such as virus scanning functions. These third party applications may actually "intercept" each file access attempt and scan the file for viruses or perform other tests prior to performing the actual access operation. Unfortunately however, performing a scan operation or other tests each time a file is accessed consumes a significant amount of time. Therefore, a log of information is typically maintained to store version information for each file. For example, the log may maintain a list of files on the system and an indication as to whether each file has been scanned, and if so, which version of virus definition file was used. Using the log of information, the virus scanner can reduce processing time by only scanning files in the file system that are new or modified, or that were scanned by an out-of-date virus definition file.

Although the use of an information log provides a significant improvement over previous systems that scanned every file before each access, using such a log suffers from some drawbacks. For example, maintaining such an information log requires a significant amount of overhead. Moreover, the process of accessing the log to determine whether items have been scanned reduces overall system performance since a separate file must be located on disk and examined. Additionally the log of information is not updated as files are copied or backed up causing unnecessary scanning operations in certain circumstances.

One solution to the performance problems associated with keeping an information log as a separate file has been to keep an "in-memory" log that is created and stored in volatile memory, e.g., RAM. The in-memory log may be accessed more quickly than a separate file, and therefore performance of the system increases when using the in-memory log in place of the log file described above. However, the in-memory log is erased or lost when the power is not delivered to the system, such as when the system is turned off, shut down or rebooted. Thus, any state information or version information may not be determined quickly following a cessation of power. Another drawback associated with the in-memory log is that such a log consumes a significant amount of the operating memory used by the system. Therefore, the in-memory log has not provided an adequate solution to the above-described problems.

It is with respect to these and other considerations that the present invention has been made.

SUMMARY OF THE INVENTION

The present invention solves these problems by creating and using a version-specific attribute or property that is stored as part of the file, contains specific version information relating to how or when the attribute was created and is automatically invalidated when a predetermined "update" event occurs. Third party applications may generally create and access these versions-specific attributes to thereby eliminate the need for external logs or databases.

An aspect of the present invention relates to a method of providing version-specific information associated with a file stored in a computer system to an application. The method involves creating a version-specific attribute that is associated with the file, maintaining the version-specific attribute to reflect relevant updates to the file by automatically invalidating the version-specific information in response to predetermined access requests and allowing the third party application to analyze the version-specific attribute.

In accordance with other aspects of the present invention, the application is a third party application such as a virus scan application or a replicator-type application that creates redundant copies of files for back-up or performance purposes. The version-specific attribute of the present invention may comprise meta information, version information and mask information. The version information relates to the version of the application used to create the version-specific attribute and the mask information relates to a policy or definition of the predetermined events that may invalidate the version specific attribute. In yet other embodiments, the version-specific attribute may further comprise a digital signature or other security information to either prevent unauthorized access to the attribute or the file or to provide a validating element for other applications in determining whether the file has been corrupted.

In accordance with still other aspects of the present invention, the version specific attribute may be invalidated based on predetermined events such as modification of the data within the file, the metadata associated with the file or when other version-specific properties change. The invalidation act may be a deletion or truncation of the version specific attribute, or any other method of indicating that the version-specific attribute is invalid.

In accordance with another aspect, the present invention relates to a file format having a version-specific attribute, wherein the attribute has a meta information section, a version information section for storing information related to the version of a file or of an application used to create the version-specific attribute, and a mask information section for storing information related to predetermined events for invalidating the version-specific attribute. Additionally, the invention relates to a file system providing the protocol for creating and maintaining such version-specific file attributes.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description of presently preferred embodiments of the invention, and to the appended claims.

DETAILED DESCRIPTION OF THE INVENTION

The present invention relates to a file system that provides for the creation of version-specific attributes or properties. The version-specific attributes are similar to other file attributes in that they may be stored as part of a file, whether through a header identification pointer or by storing the information in a resident manner with the file data. However, the version-specific attributes have different features, including the ability to store version-specific information related to the application that created the version-specific property. Moreover, the version-specific property is automatically updated upon the occurrence of a predetermined event. Indeed, information related to which events cause invalidation may also be stored as part of the version-specific property.

Figure 1:
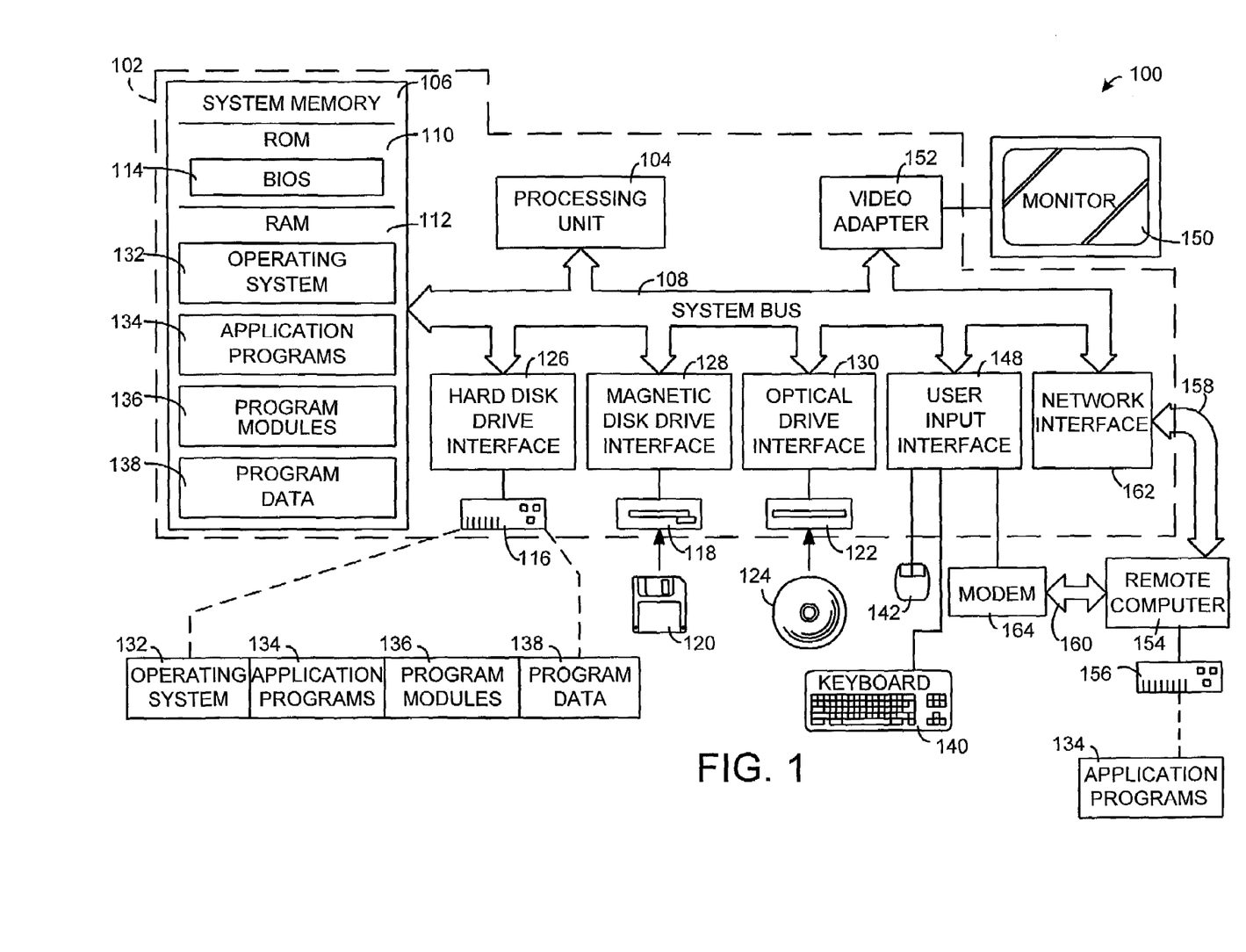
FIG. 1 is a functional diagram of a computer system that may incorporate the present invention.

FIG. 1 illustrates an example of a suitable computing system environment 100 in which the present invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

In addition to the environment 100 shown in FIG. 1, the invention may be operational with numerous other general purpose or special purpose computing system environments or configurations. Examples of well known computing system, environments, and/or configuration that may be suitable for use with the invention include, but ate not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Moreover, the present invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architectures (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDEROM, digital versatile disks (DVD) or other optical disk storage, magnetic cassettes, magnetic tape, magnetic disk storage or other magnetic storage devices, or any other medium which can be used to store the desired information and which can be accessed by computer 102. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110, RAM 112 typically contains files and/or program modules that are immediately accessible to and/or presently being operated on by processing unit 104. By way of example, and not limitation, FIG. 1 illustrates operating system 132, application programs 134, other program modules 136, and program data 138. Additionally, the computer 102 comprises a file system, which defines the format for the files of system 102, and further defines version-specific attribute formats, as discussed below.

The computer 102 may also include other removable/non-removable, volatile/nonvolatile computer storage media. By way of example only, FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through an non-removable memory interface such as interface 126, and magnetic disk drive 118 and optical disk drive 122 are typically connected to the system bus 108 by a memory interfaces, such as interfaces 128 and 130, respectively.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138.

A user may enter commands and information into the computer 102 through input devices such as a keyboard 140 and pointing device 142, commonly referred to as a mouse, trackball or touch pad. Other input devices (not shown) may include a microphone, joystick, game pad, satellite dish, scanner, or the like. These and other input devices are often connected to the processing unit 104 through an input interface 148 that is coupled to the system bus 108. A monitor 150 or other type of display device may also be connected to the system bus 108 via video adapter 152. In addition to the monitor, computers may also include other peripheral output devices such as speakers and printer not shown.

The computer 108 may operate in a networked environment using logical connections to one or more remote computers, such as a remote computer 154. The remote computer 154 may be a personal computer, a server, a router, a network PC, a peer device or other common network node, and typically includes many or all of the elements described above relative to the computer 102.

When used in a LAN networking environment, the computer 102 is connected to the LAN through a network interface or adapter 162. When used in a WAN networking environment, the computer 102 typically includes a modem 164 or other means for establishing communications over the WAN, such as the Internet. The modem 164, which may be internal or external, may be connected to the system bus 108 via the user input interface 148, or other appropriate mechanism. In a networked environment, program modules depicted relative to the computer 102, or portions thereof, may be stored in the remote memory storage device. It will be appreciated that the network connections shown are exemplary and other means of establishing a communications link between the computers may be used.

Figure 2:
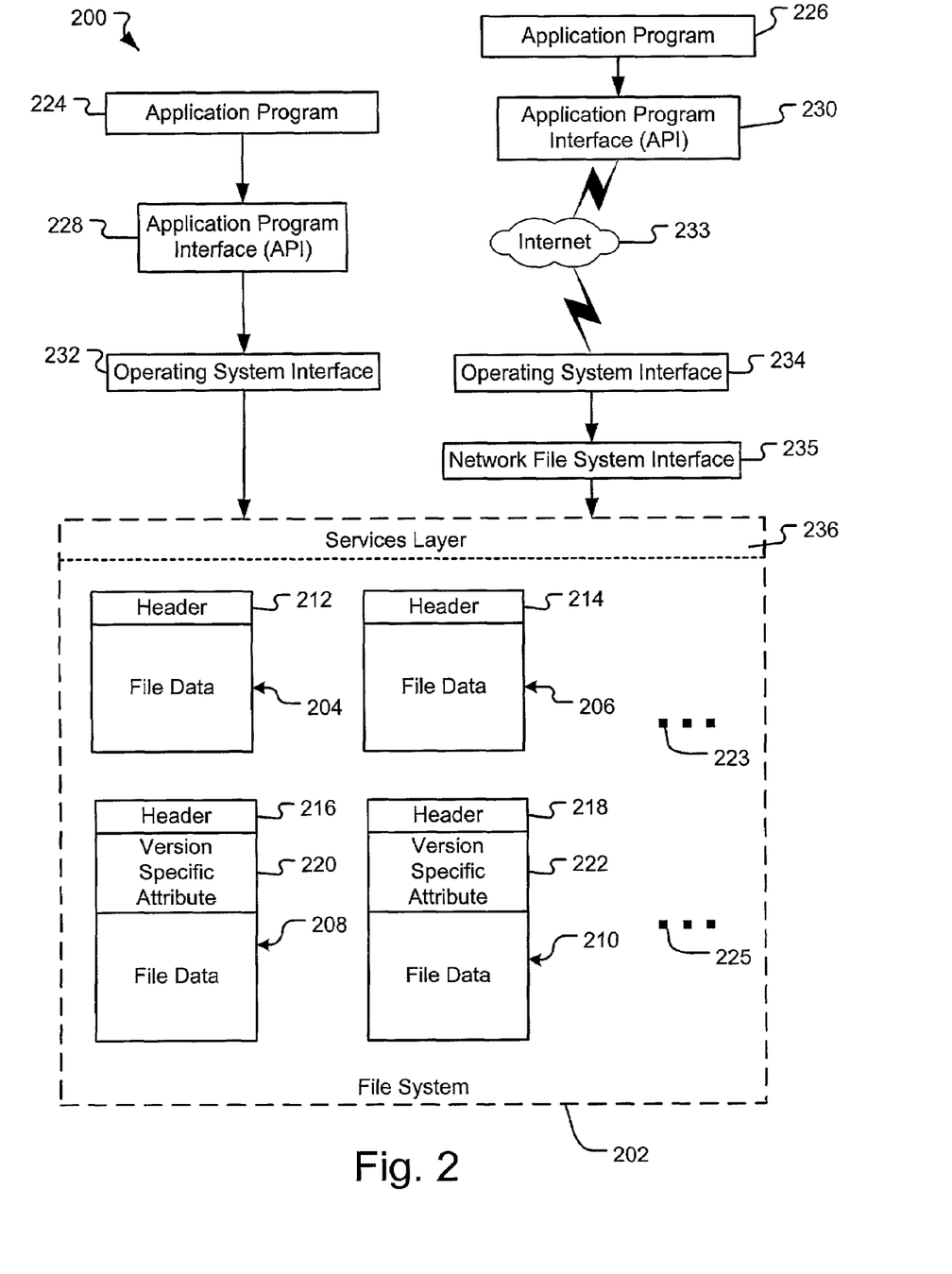
FIG. 2 is a block diagram illustrating software components of the present invention.

FIG. 2 illustrates an example of a suitable software operating environment 200 in which the invention may be implemented. The software operating environment 200 is only one example of a suitable operating environment and is not intended to suggest any limitation as to the scope of use or functionality of the invention. The software environment 200 has a file system 202 which defines the format and structure of various files 204, 206, 208 and 210. Typically, the file system 202 also provides the overall structure in which files are named, stored and organized. Additionally, the file system provides the protocols for accessing the files and any file associated items. In an embodiment of the invention, the file system is the Windows NT® file system, hereinafter "NTFS," which is produced by Microsoft Corporation. For more information regarding NTFS, see chapter 9 of "Inside Windows NT, Second Edition," by David Soloman, Microsoft Press 1998. In other embodiments, other file system protocols may be used.

As shown in FIG. 2, files 204, 206, 208 and 210 each have a header 212, 214, 216 and 218, respectively. The headers 212, 214, 216 and 218 comprise information related to each of their respective files. The header information may include file attributes such as the time the file was last modified, the time the file was last saved, the length of the file, the name of the file, among others. In addition to header information, two files 208 and 210 depicted in FIG. 2 have also version-specific attributes 220 and 222, respectively. The version-specific attributes 220 and 222 comprise version-specific information and may be invalidated by other events occurring with respect to the files 208 and 210 respectively. Of course, a file system may comprise many other files with or without version-specific attributes as indicated by ellipses 223 and 225.

The software environment 200 shown in FIG. 2 also illustrates the interaction of the file system 202 and application programs, such as applications 224 and 226. In one embodiment, application programs 224 and 226 are third party applications, i.e., applications that interact with the file system as opposed to applications integral with the file system itself. Applications 224 and 226 may interact with the file system 202 through application program interfaces 228 and 230, respectively. Additionally, the application interface 228 communicates with the file system 202 through an operating system, e.g., operating system interfaces 232. In alternative embodiments (not shown), the application program interfaces 228 may communicate directly with the file system 202. The application program interface 230 communicates with the operating system interface 234 through a system of networked computers, such as the Internet 233. Additionally, the operating system interface 234 relates to the operating system interface of a server computer system, wherein the application program interface is associated with a client computer system. The operating system interface 234 communicates with the file system 202 through a network file system interface 235.

Although not shown, other embodiments may incorporate the present invention, such as embodiments wherein the applications 224 and 226 communicate directly with the file system 202 or communicate with the file system 202 through other layers of control modules. Hence, the present invention involves an application or program module, such as applications 224 and 226, which communicates with the file system in one way or another, to access files, such as files 204, 206, 208 and 210 wherein the access may involve reading, executing updating, or some other function to be performed on the file.

The file system 202 provides various system functions. Besides providing the basic structure for the files 204, 206, 208 and 210, the file system 202 may also provide various operation functions such as ensuring that a file access request relates to an existing file, whether the module making the request has permission to make and perform the request, among others. Therefore the file system 202 provides a services layer 236 of interaction between an application, such as applications 224 and 226 and the actual files 204, 206, 208 and 210. This layer of interaction 236 is in addition to possible application program interfaces 228, 230 and possible operating system interfaces 232 and 234.

With respect to the version-specific attributes 220 and 222, an embodiment of the invention application programs 224 and 226 may create and use the version-specific attributes 220 and 222 related to files 208 and 210 respectively. Alternatively the services layer 236 may create and use the version-specific attributes. Once a version-specific attribute has been created, another application may access the attribute and decide to perform an operation on the file based on the evaluation of the version-specific attribute 220 or 222. Additionally, the other applications may perform actions on a file that may invalidate the version-specific attribute thereby causing a different result once an application tests for the existence of a valid version-specific attribute.

In one particular example, the services layer 236 provides a virus-scan function that performs virus scanning and cleaning functions each time a file, e.g., files 204, 206, 208 or 210, is accessed by any other application or module. To further expand the example, the application program 224 may be a word processing application and the files 204, 206, 208 and 210 are word processing types files such as text files. In such a case, the virus scan program module, as part of services layer 236, may actually be utilized by the operating system interface to scan files that the word processing application 224 requests to access. In this example, the virus scanner may create version-specific attributes, such as attributes 220 and 222 for files that have been scanned for viruses. Therefore, the next time a request is made by application 224 for one of the files 208 and 210, the virus scan application merely identifies the existence of a valid version-specific attribute, such as attribute 220 and 222, to determine whether another scan operation is necessary. If a valid version-specific attribute is identified, then no scan is necessary in this particular example. Contrarily, if no version-specific attribute is identified, such as when files 204 or 206 are accessed, then the virus scan application recognizes that these files have either not been scanned or have been modified since the time when they were scanned.

Continuing with the virus-scan example, assuming virus scan application, as part of services layer 236, scans one of the files 204 or 206, a new version-specific attribute (not shown) may then be created and associated with the scanned file. The newly created attribute (not shown) is then stored along with the file so that the attribute is available for future access requests.

In another embodiment, the version-specific attribute may be encoded with a digital signature that may be accessed and evaluated by other applications. This digital signature can then be tested to determine whether the file is a valid copy. In such a case, if the file has been tampered with by another application, i.e., corrupted, the digital signature will be invalidated. An invalidated digital signature may be treated as if the signature did not exist and, consequently, the file may be treated as invalid.

The version-specific attribute may further comprise other security information to prevent unauthorized access to the attribute or the file. This information is used by the services layer 236 as a means to lock the attribute from use by inappropriate applications, such as virus applications. The services layer may be configured to evaluate the version-specific attribute on each access for the purposes of ensuring that only valid applications access the attribute, or the file itself.

Figure 3:
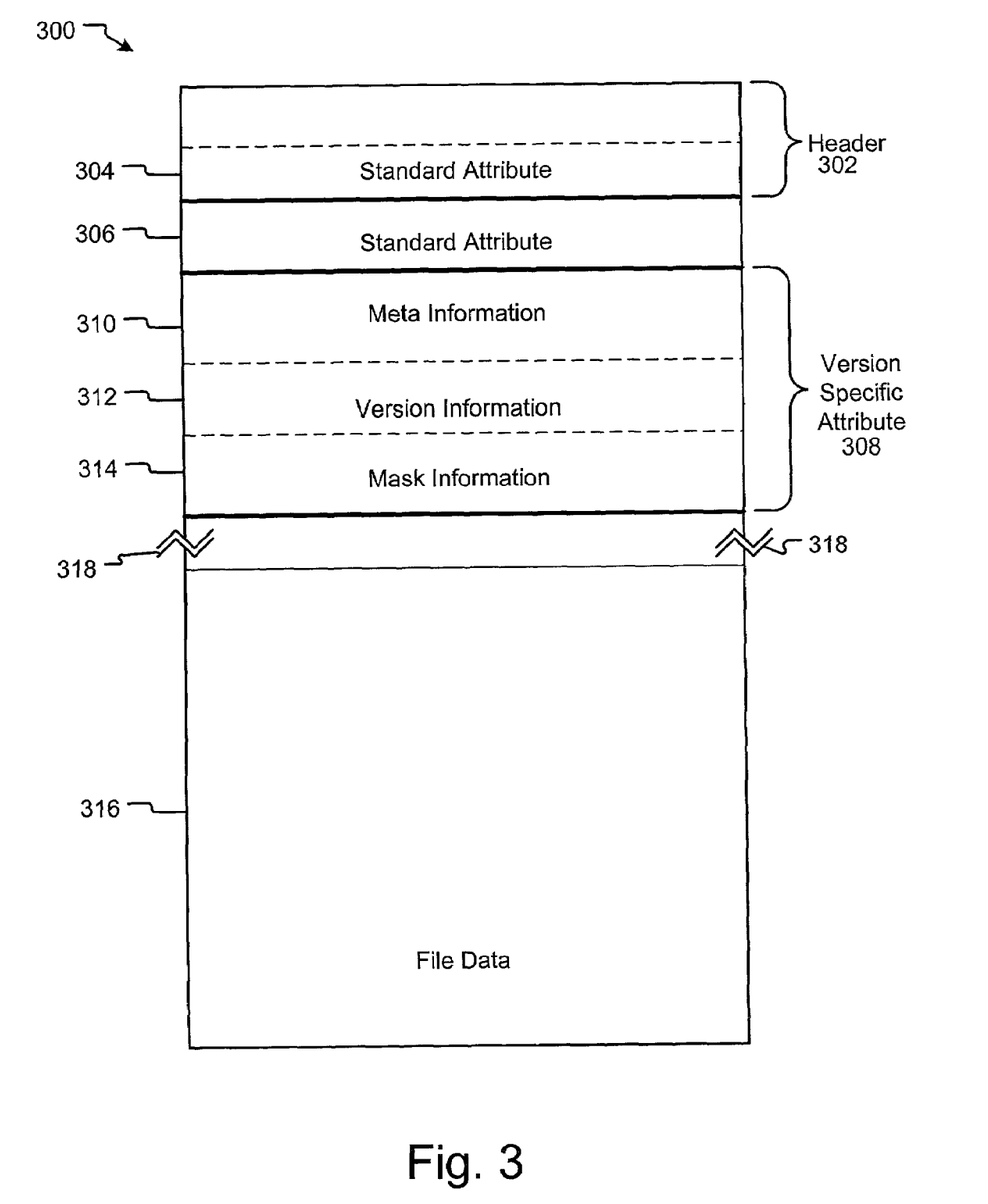
FIG. 3 is a functional diagram illustrating the components of a file according to the present invention.

A file 300 incorporating aspects of the present invention is shown in FIG. 3. The file 300 comprises file data 316, i.e., the file information itself, and a header 302, which, in this particular example, comprises general information including some standard attributes 304 wherein the standard attributes may be such items as time or length of file. In other embodiments, the header may not include standard attributes, and instead the standard attributes would be stored in another section, such as section 306 as shown in FIG. 3.

The file 300 also has a version-specific attribute 308 as shown in FIG. 3. The version-specific attribute 308 comprises three types of information. It has a meta information section 310, which typically has a name for the attribute such as the name of the third party application used to create the attribute, and possibly other information, such as the length of the attribute, its address location on the disk, among others.

The version-specific attribute 308 also has a version information section 312. The version information section 312 comprises information related to the version of the specific application that was used most recently to create the version-specific attribute 308, such as the version of the third party application used to create the attribute. That is, since such version information may be relevant to the program module that is evaluating the attribute, a section is dedicated to this type of information.

The version-specific attribute 308 also comprises a mask information section 314 which is used to provide information to the file system as to what is a relevant update. The mask information section 314 essentially dictates to other applications or to the file system the protocol or policy in which events may or may not invalidate the version-specific attribute 308.

In a particular embodiment, if the version-specific attribute 308 was created by a virus scan application whether part of the file system or not, then the meta information section 310 may hold the name of the virus scan application used to create the version-specific attribute 308. Additionally, the version information section 312 would include information related to the particular virus definition file used when the version-specific attribute was created. Version information in this particular instance is important because virus scan applications are frequently updated to include recently detected viruses. Therefore virus scan applications should not only determine whether a file has been scanned previously, but whether it has been scanned with an updated virus definition file.

With respect to the mask information section 314, when a virus scan application creates the version-specific attribute 308, the mask information section 314 may include the specific events that would cause an invalidation of the version-specific attribute 308, wherein the events may be uniquely pertinent to a virus scan application. Such events that may cause an invalidation of attribute 308 in this particular instance may include modifying the file data section 306, either by adding new file data or by erasing file data. In other embodiments, other predetermined events may cause the invalidation of version-specific attribute.

In this particular example, predetermined events that may specifically not be included in the mask information section 314 and therefore do not cause the version-specific attribute to be invalidated may include read only access events, changing a file's name, or backing up the file 300. Indeed, if the event does not cause the version-specific attribute to be invalidated, then the attribute remains with the file, even in such cases as when the name of the file is changed.

The version-specific attribute 308 is created by a third party application, e.g., an application separate from the file system. In creating the version-specific attribute, the third party application supplies the name, version and mask information to the file system. The file system then creates and associates the attribute with the particular file. In an embodiment of the invention, one method of creating the version-specific attribute 308 involves a third party application requesting Windows NTFS to create the attribute. The commands used to create a version-specific attribute in the embodiment are shown in Table 1. The code shown in Table 1 assumes that a file, a.txt, has already been created, and that "Inoculan" is the name of the third party application.

TABLE 1

| ine # | Command with Parameters | Result |
|---|---|---|
| 1 | NTCreateFile ("a.txt: Inoculan", Version_Specific_Attr) | Creates Handle (H1) |
| 2 | NTDeviceIOControl (H1, SetVersionScope, Mask) | Sets Mask Information |
| 3 | NTWriteFile (H1, InoculanVersion, Len) | Writes Version Information |

As shown in Table 1, the third party application merely requests that a version-specific attribute be created and then writes data to the attribute before closing the created attribute. In order for this function to work therefore, the file system must have previously defined the version-specific attribute type. In other embodiments, other methods may be used to create and populate version-specific attributes. Once created, the version-specific attribute 308 may be evaluated and/or invalidated by other applications when a file is accessed.

In an alternative embodiment of the invention, another command may be inserted prior to the NTWriteFile command, wherein the inserted command relates to setting security for the version-specific attribute. A separate security descriptor may be created or defined for each version specific attribute. Alternatively, each application, e.g., Inoculan, may use a digital signature to verify the integrity of the version specific property in which that application is interested. Once the type of security is defined, the information may be stored within the version specific attribute prior to the NTWriteFile command.

Following the NTWriteFile operation, the version specific attribute may be closed using the NTCClose operation.

Although the file 300 is shown and described as having only one version specific attribute, the file 300 may have other attributes, including other version specific attributes as indicated by the breaks 318. Indeed, several third party applications may request that persistent state information be stored as part of the file and thus numerous version specific attributes, such as attribute 308 may be created and stored along with file 300.

The exemplary physical environment having now been discussed, the remaining part of this description section will be devoted to a description of the operative modules embodying aspects of the invention. The logical operations of the various embodiments of the present invention are implemented (1) as a sequence of computer implemented steps or program modules running on a computing system and/or (2) as interconnected hardware or logic modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 4:
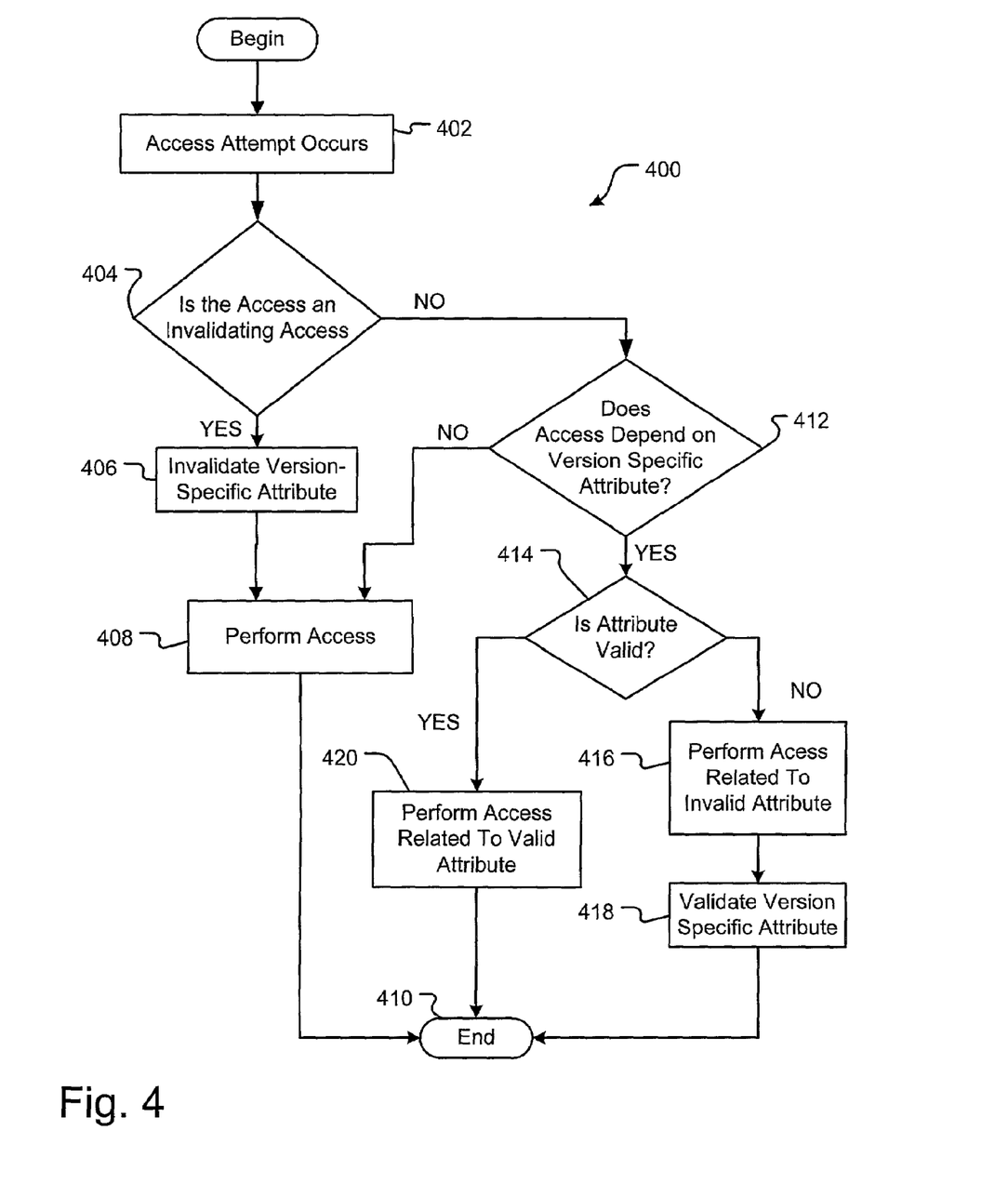
FIG. 4 is a flow diagram illustrating the functional characteristics of an embodiment of the present invention.

FIG. 4 is a flow chart of the operational characteristics related to accessing a file according to aspects of the present invention. Prior to the beginning of flow 400 a file such as files 204, 206, 208 or 210 shown in FIG. 2 exists within a file system, such as file system 202 (FIG. 2). In an embodiment of the invention, once a file has been created, then any attempt to access that file initiates the flow 400 shown and described with respect to FIG. 4. Indeed, process 400 begins with access attempt 402, wherein the access attempt 402 relates to any read, execution, or update to a file within the file system. The access attempt may be performed by the third party application, such as application 224 (FIG. 2) or by the services layer 236 (FIG. 2).

Following access attempt 402, determination act 404 determines whether the access is an invalidating access. Determining whether an access is an invalidating access involves an evaluation of mask information within each version-specific attribute, assuming there is more than one, of the particular file being accessed. Evaluating the mask information provides what types of accesses to that file may or may not require that the particular version-specific attribute should be invalidated. Consequently, comparing the mask information to the actual access attempt provides whether the version-specific attribute should be invalidated. When such a relevant update access attempt is identified by determination act 404, flow branches YES to invalidate operation 406.

In an embodiment of the invention the version-specific attribute is created and used by a virus-scan application. In such a situation, determination act 404 determines whether the access attempt is a relevant-update access attempt based on criteria set by the virus-scan application. That is, the virus-scan application has predetermined what a relevant update access is, such as whether the access attempt will modify actual file data by changing old data or adding new data. For example, a particular virus scan application may want its version-specific property to be invalidated whenever any change is made to data within the file, including the creation of new data. Invalidations should not occur when changes involve only version-specific properties or other file metadata or other meta information.

In an alternative embodiment, a replicator application may create and use the version-specific attribute. In such a case, the replicator application may want its version-specific property to be invalidated whenever any change is made to either the data or metadata of the file. These particular version-specific properties should be invalidated whenever any change is made that does not solely affect this class of version-specific properties. In this instance, by defining a specific class we prevent the presence of multiple replicators from causing a file to be replicated over and over again, where each instance of replication by one replication application appears as a need to replicate by a second replicator application.

Invalidate operation 406 invalidates the version-specific property or attribute, such as attribute 308 (FIG. 3). In an embodiment, the invalidation act 406 deletes or truncates the version-specific attribute to "invalidate" that version-specific attribute. Alternatively, the invalidate operation 406 marks the version-specific attribute or otherwise provides an indication that the attribute is invalid. In essence, the act of invalidating the attribute must allow the application that relies on the version-specific attribute to recognize that the version-specific attribute has been invalidated. Other methods of invalidating the version-specific attribute may include adding more information to the invalidating access or to the version-specific attribute or modifying the information therein. The invalidation act 406 does not change other items, such as Change Time, Last Write Time, or Last Access Time.

If the file has more than one version-specific attribute then operations 404 and 406 are repeated for each version-specific attribute.

Following the invalidation act 406, perform access operation 408 performs the requested access on the file. Importantly, the act of performing the access on the file is initiated after the version-specific attribute has been invalidated. Otherwise, the version-specific attribute may be unreliable. Following perform access operation 408, flow 400 ends at end operation 410.

If determination act 404 determines that the access attempt does not relate to an invalidating access, then flow branches NO to determination operation 412. Determination operation 412 determines whether the access depends on a version-specific attribute, e.g., whether the access attempt is an access attempt by an application that uses the version-specific attribute in performing its operations. For example, a virus scan application that uses version-specific attributes may be generating the access attempt, and in such a case, determination operation 412 determines that the access attempt is generated by such an application that uses the version specific attributes.

If the access attempt is not performed by an application relying on version-specific attributes then flow branches NO to perform access operation 408. Perform access operation 408 performs the originally requested access operation. In the case where perform access operation 408 follows determination operation 412, then the access operation does not relate to an operation requiring invalidation, as determined by determination act 404. For example, the access attempt may relate to a read operation wherein the user is not allowed to modify any actual data. Following perform access operation act 408 the process flow ends at 410 as discussed above.

If determination operation 412 determines that the access does depend on version-specific attribute, then flow branches YES to determination act 414. Determination act 414 analyzes the version-specific attribute to determine whether it is valid. Determining whether an attribute is valid may involve determining whether the attribute exists, whether it has been marked as invalid, or whether it has been truncated so that information is not fully available, etc. If determination act 414 determines that the attribute is not valid, then flow branches NO to perform access related to invalid attribute act 416.

Perform act 416 performs a predetermined function based on the determination that the access is invalid. In an embodiment, if the access attempt is generated by a virus scan application, then perform operation 416 relates to performing such a virus scanning function on the file.

Following the performance of the operation related to invalid attribute 416, create version-specific attribute act 418 creates or validates a version-specific attribute with respect to that file. Validating a version-specific attribute may involve creating a version-specific attribute for that file, or adding more information to the existing version-specific attribute. Other embodiments may validate the attribute in other ways, as long as the attribute appears valid at a later time by providing an indication the attribute is valid. Following the validate version-specific attribute act 418, process 400 ends at end operation 410.

If determination act 414 determines that the version-specific attribute was valid then flow branches YES to perform operation 420. Perform operation 420 relates to performing any act related to a determination that the version-specific attribute was valid. Depending upon the particular application that uses version-specific attributes, perform operation 420 may comprise different types of operations. In one example, if the attribute is determined to be valid, then no operation is performed such as in the virus scan situation. In such a case, if the determination act 414 determines that the version-specific attribute is valid, then the file has been scanned previously and another scan is not necessary. Consequently, no operation is to be performed on that file and operation 420 simply passes to control end operation 410. In other embodiments, a determination that the version-specific attribute is valid may initiate an operation be performed at 420.

The above described system and method provides a significant advantage over prior methods of providing version information to program modules or applications since the version information is part of the file, as opposed to being resident in a separate log or database file. The application is not required to access exterior-type files that may be unavailable, corrupt or otherwise unmanageable. Additionally, the file attribute is not lost when the power is shut off and the attribute does not consume extraordinary amounts of operating memory, as is the case for in-memory information logs. Moreover, the process automatically updates, i.e., invalidates the version specific information when a relevant event occurs. Automatically invalidating version specific information prevents relevant updates from being missed and further increases the probability that unnecessary actions are not taken. For example, with respect to the virus scan embodiment, version information is not to be invalidated on a backup or copy function such that future accesses do not require virus scanning, where prior art methods did not maintain such version information following backup and/or copy functions and therefore additional processing steps were performed.

As discussed above, the invention described herein may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

Additionally, although the invention has been described in language specific to structural features and/or methodological steps, it is to be understood that the invention defined in the appended claims is not necessarily limited to the specific features or steps described. As an example, other applications may utilize version specific attributes besides virus scanning applications and replicators. Additionally, other types of file systems may benefit from the principles of the present invention. Therefore, the specific features and steps are disclosed as preferred forms of implementing the claimed invention.

What is claimed is:

1. A method of providing a file stored in a computer system with version-specific information relating to a virus scanning application that is independent from an application used to create the file, the method comprising:

receiving a request from the virus scanning application to create a version-specific attribute associated with the file, wherein the version-specific attribute contains version-specific information relating to the virus scanning application;

maintaining the version-specific attribute to reflect relevant updates to the file by automatically invalidating the version-specific information in response to a predetermined event, wherein the version-specific attribute comprises mask information providing information related to which predetermined events invalidate the version-specific information;

receiving a request from the virus scanning application to evaluate the version-specific attribute; and providing the version specific information to the virus scanning application in response to the request to evaluate the version-specific attribute.

2. A method as defined in claim 1 wherein the version-specific information relates to a version of a virus definition file.

3. A method as defined in claim 1 wherein the predetermined event is an update to file data.

4. A method as defined in claim 1 wherein the method further comprises:

providing security information within the version-specific attribute.

5. A method as defined in claim 1 wherein the invalidating act further comprises deleting the version-specific attribute.

6. A computer program product readable by a computer and encoding instructions for executing the method recited in claim 1.

7. A method of accessing a file stored in a computer system, the file having an associated version-specific attribute provided by a virus scanning application that is independent from an application used to create the file, wherein the version-specific attribute comprises meta information relating to the virus scanning application and mask information providing information related to which predetermined events invalidate the version-specific attribute, said method comprising:

receiving an access attempt relating to an access request;

determining whether the access attempt relates to an invalidating access;

if the access attempt relates to an invalidating access:
invalidating the version-specific attribute; and
performing the access operation related to the access request; and if the access attempt does not relate to an invalidating access then performing the access operation related to the access request.

8. A method of accessing a file as defined in claim 7 wherein if the access attempt does not relate to an invalidating access, then said method further comprises:

determining whether the access depends on the version specific attribute;

if the access does not depend on the version specific attribute, then performing the access operation related to the access request; and if the access depends on the version specific attribute:
determining whether the attribute is valid; and
performing a predetermined operation with the virus scanning application based on whether the attribute is determined to be valid.

9. A computer program product readable by a computer and encoding instructions for executing the method recited in claim 7.

10. A computer-readable medium having stored thereon a data structure, wherein the data structure comprises:

an actual file data section containing actual file data;

a header section; and a version-specific attribute section, wherein the version-specific attribute section is created by a virus scanning application that is independent from an application used to create the actual file data, and wherein the version-specific attribute comprises a meta information section and a mask information section, the mask information section providing information related to which predetermined events invalidate the version-specific attribute, and wherein the version-specific attribute is invalidated in response to one of said predetermined events.

11. A computer-readable medium as defined in claim 10 wherein the meta information section stores the name of the attribute, and wherein the version-specific attribute further comprises:

a version information section for storing information related to the version of a virus definition file used with the virus scanning.

12. A computer readable medium as defined in claim 11 wherein the predetermined event relates to a modification of the data structure.

13. A computer program product readable by a computer and encoding instructions for executing a computer process for managing version-specific information for a file within a file system, said computer process comprising:

storing version-specific information as a version-specific attribute associated with the file, wherein the version-specific attribute comprises meta information relating to a virus scanning application that is independent from an application used to create the file and mask information providing information related to predetermined events which invalidate the version-specific attribute; and invalidating the version-specific attribute in response to a predetermined access attempt.

14. A computer program product as defined in claim 13 wherein the computer comprises a file system and the acts of storing and invalidating are performed by the file system.

15. A computer program product as defined in claim 13 wherein the version-specific information relates to a virus definition file used with the virus scanning application.

16. A computer program product as defined in claim 15 wherein the predetermined access attempt relates to a modification of the file.

17. A computer program product as defined in claim 16 wherein the version-specific attribute remains valid following one of the following access attempts: copy, rename or backup.

* * * * *